Mar. 3, 1925.
O. LARSEN
1,528,063
LIQUID MEASURING DEVICE
Filed Sept. 5, 1922 2 Sheets-Sheet 1
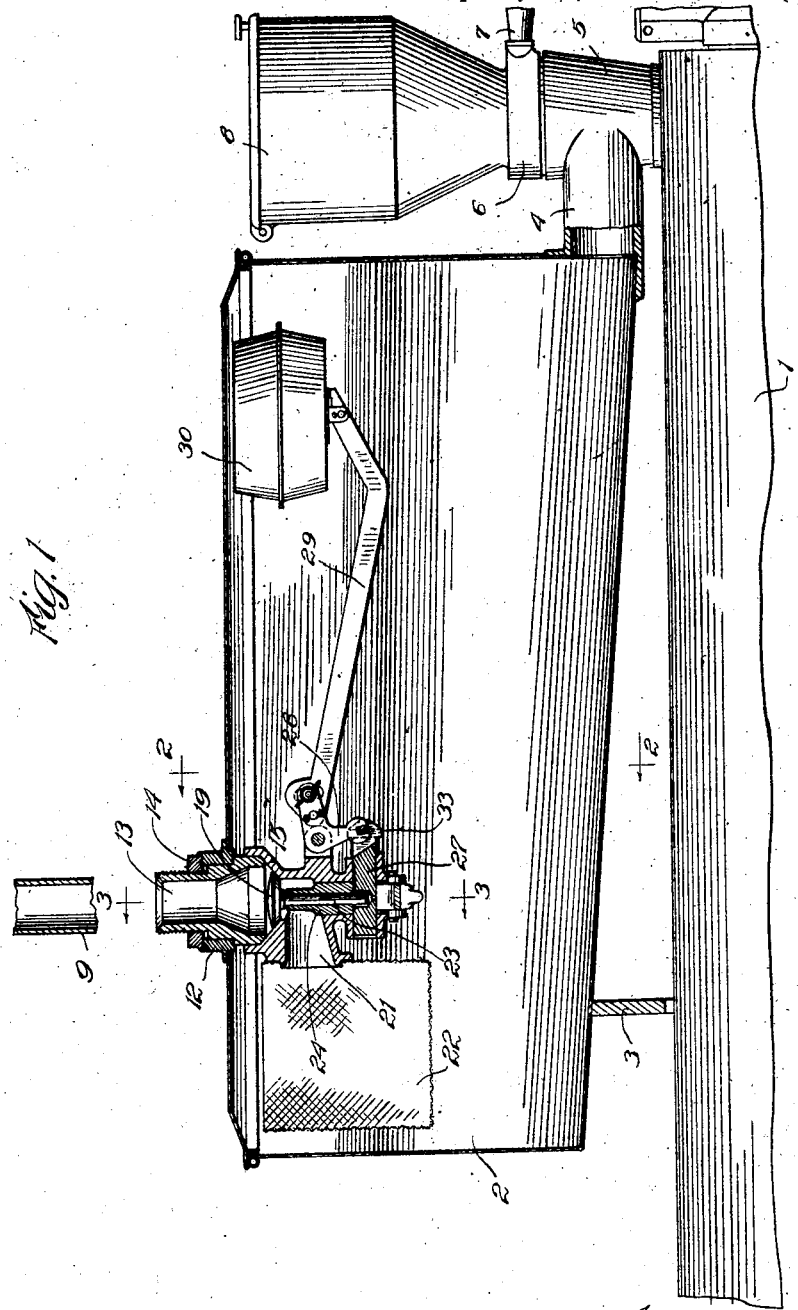
Inventor
Olaf Larsen Mar. 3, 1925.                                                                  1,528,063
O. LARSEN
LIQUID MEASURING DEVICE
Filed Sept. 5, 1922                              2 Sheets-Sheet 2
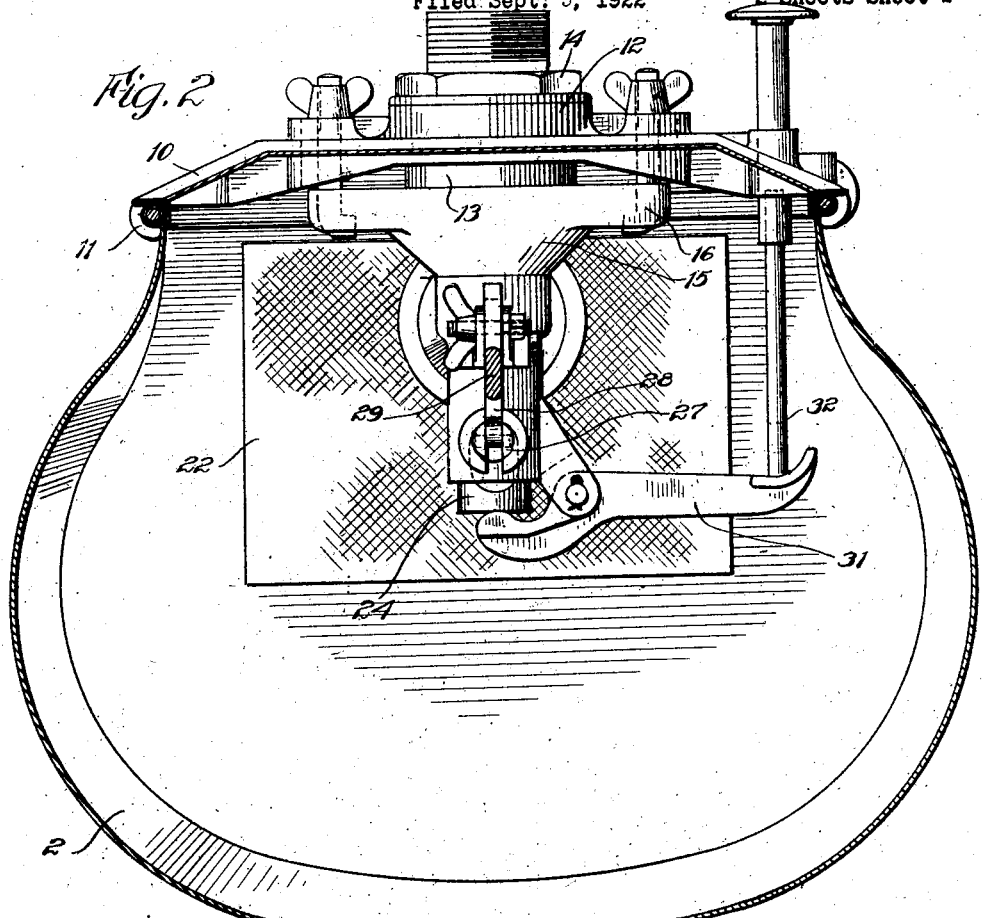
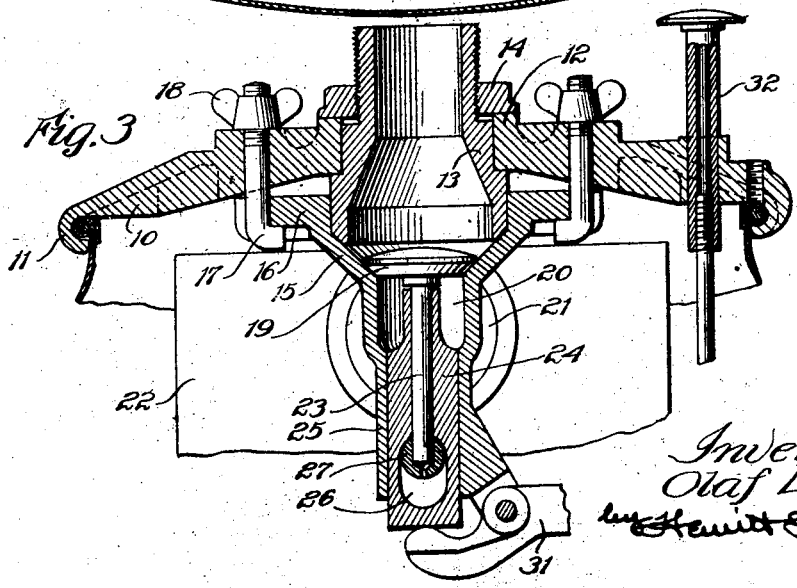
Inventor
Olaf Larsen Patented Mar. 3, 1925.

1,528,063

UNITED STATES PATENT OFFICE.

OLAF LARSEN, OF FORT ATKINSON, WISCONSIN, ASSIGNOR TO THE CREAMERY PACKAGE MFG. COMPANY, OF CHICAGO, ILLINOIS, A CORPORATION OF ILLINOIS.

LIQUID-MEASURING DEVICE.

Application filed September 5, 1922. Serial No. 586,381.

*To all whom it may concern:*

Be it known that I, OLAF LARSEN, a citizen of the United States, residing in the city of Fort Atkinson, in the county of Jefferson and the State of Wisconsin, have invented certain new and useful Improvements in Liquid-Measuring Devices, of which the following is a specification. The invention relates to a liquid measuring device having particular application to batch measuring tanks employed with ice cream freezers.

The commercial ice cream freezer is commonly equipped with a batch measuring tank from which measured quantities of the liquid mixture are successively discharged into the freezer cylinder, the tank being filled from a storage supply piped to the freezer.

The manual opening and closing of the inlet valve with sight control of the quantity of mixture drawn necessitates the immediate attention of an attendant, and further results in inaccurate measurement due to the tendency of the flowing ingredients to froth and make difficult the determination of the actual level of the liquid.

One of the objects of this invention is to provide a float controlled supply inlet valve which, when opened, will automatically admit to the batch tank an exactly measured predetermined quantity of mixture, and thereupon close the inlet against the further inflow of mixture when the tank is discharged.

Other objects include the positive locking of the valve in closed position after each operation and until again manually opened; facility for disassembling and cleaning the apparatus; adjustability to measure variable quantities of mixture; and simple durable construction of parts.

Further objects and advantages will be apparent in the following description of a preferred embodiment of my invention, which I have illustrated in the accompanying drawings.

In the drawings, Fig. 1 is a longitudinal sectional view of the device as mounted in an ice cream freezer batch tank. Fig. 2 is a cross sectional view taken on the plane of the line 2—2 in Fig. 1. Fig. 3 is a cross sectional view of the valve parts taken on the plane of the line 3—3 in Fig. 1.

The reference numeral 1 indicates a fragmentary upper portion of the freezing cylinder of an ice cream freezer above which is mounted a batch tank 2 supported at its rear end upon a bracket 3 carried by the freezer. Secured to and supporting the lower portion of the front end of the tank is a discharge pipe 4 opening into the tank and leading to a freezer inlet 5 communicating with the freezing chamber within the cylinder 1.

The freezer inlet 5 preferably comprises a tubular casing within which is seated a tubular valve 6 rotatable by the handle 7 to bring its lateral port into register with the tank discharge outlet 4. The upper end of the valve 6 may carry a fruit feed funnel 8 communicating through the tubular valve 6 with the freezing chamber. A supply pipe 9, leading from a mixture supply reservoir, conducts the liquid to the batch tank, an ordinary connection with the tank inlet control valve being omitted from the drawings for better illustration of the valve.

A supporting cross rail 10 preferably bridges the lateral walls of the tank, secured to the upper edges thereof by means of its curved ends 11 forming recesses to receive the beaded edges of the tank walls. The mid portion of the rail 10 preferably forms an annular sleeve 12, within which is supported the upper section 13 of a valve casing having an outer peripheral shoulder abutting the underside of the sleeve 12, and secured therein by a collar 14 threaded on the upper end of the casing and bearing upon the upper side of the sleeve 12.

A lower section 15 of the valve casing is detachably secured in telescoping abutment with the upper section, preferably by means of lateral wings 16 having slotted ends to receive a pair of bolts 17 supported in the rail 10 and tightened by wing nuts 18. The section 15 is constructed to form a seat within the casing for a valve 19 controlling the discharge orifice 20 opening laterally through the outlet 21 from which the mixture is discharged into a strainer 22, preferably supported on the casing section 15, and thence into the batch tank 2.

The valve 19 is operatively supported by a depending stem 23 having a sliding bearing in a carrier 24, the latter being slidably supported in an extension 25 of the casing section 15 and effecting an end closure of the discharge chamber 20. The upper end of the carrier 24 extends proximately to the valve 19 and is adapted to operatively raise the latter from its seat by elevation of the carrier.

The lower end of the carrier 24 is provided with a tranverse slot 26 of elongated cross section, through which a transversely slidable bar 27 is positioned and operatively supported in the casing extension 25. The bar 27 is provided with a recess in its upper surface adapted in one position of the bar to receive the end of the stem 23 protruding into the slot 26 and thereby permit the valve 19 to descend into its seat and close the mixture inlet. In other positions of the bar 27 the stem 23 rests upon its upper surface thereby securing the valve 19 in open position.

Movement of the bar 27 is controlled by means of a bell crank 28, pivoted on the casing section 15, having one arm in operative engagement with the end of the bar 27 and the other arm connected with and supporting a bar 29 at the outer end of which is carried a float 30. The connection between the bell crank and the float bar preferably is made adjustable by any suitable means to permit changing the vertical position of the float 30 relative to the bell crank, and thus vary the height to which the float must rise to move the bar 27 into such position that the valve stem 23 will drop into the recess in the bar and effect the closing of the valve orifice.

To lift the valve into open position, there is provided a lever 31 also pivoted on the casing section 15 and having one end in operative engagement with the lower end of the carrier 24. The other end of the lever extends laterally to receive a plunger 32 slidably supported in the cross rail 10 and extending upwardly for convenient manual operation. Depression of the plunger 32 operates through the lever 31 to lift the carrier 24 and the valve 19 sufficiently to carry the stem 23 out of its recess in the bar 27, the slot 26 in the carrier being of sufficient depth to permit such upward movement of the carrier.

In the operation of my device, the desired quantity of mixture for a batch is determined and the float support bar adjustably secured to effect the closure of the valve upon the inflow of that quantity. With the freezer inlet 5 closed, depression of the plunger 32 opens the tank inlet valve 19, and with the withdrawal of the stem 23 from the recess in the bar 27 the latter is released and moves rearwardly by operation of its connections with the float 30 which falls into lowered position, the rearward movement of the bar being limited by engagement of a stop 33 with the supporting bearing for the bar. Upon release of the plunger 32 the valve 19 is held in open position by the stem 23 resting upon the upper surface of the bar 27.

The inflowing mixture passing through the screen 22 rises in the tank and carries the float 30 to the predetermined height to measure the desired quantity, the bar 27 being moved forwardly as the float rises. At the determined level of mixture the recess in the bar 27 is in register with the end of the stem 23 whereupon the latter drops thereinto and closes the inlet valve.

Upon discharging the batch of mixture from the tank into the freezer, the valve 19 remains closed and the float 30 is supported in elevated position by the positive interlocking engagement of the stem 23 within the recess in the bar 27. The filling of the tank is accomplished when desired simply by the manual depression of the plunger 32 to open the valve 19, after which no further attention is required from the operator until the measured batch is to be discharged into the freezer.

The sectional construction of the valve casing and arrangement of the operating parts permits of the ready disassembling of the valve for thorough cleaning after use.

It will now be apparent that I have provided an improved automatic measuring valve for the purposes indicated, which is of simple, durable and sanitary construction and positive in operation.

I claim as my invention:—

1. A device of the class described comprising a receptacle, and valve mechanism for admitting liquid thereto comprising a casing having a discharge orifice, a valve normally seated in said orifice having an operating stem, manually operable means for unseating said valve and opening said orifice, a reciprocatory bar positioned transversely of said stem and arranged to support said stem in position to retain said valve in open position, said bar having a recess adapted to receive said stem in one position of said bar and permit the closing of said valve, and float means controlled by the liquid in said receptacle for moving said reciprocatory bar.

2. A device of the class described comprising a receptacle, and valve mechanism for admitting liquid thereto comprising a casing having a discharge orifice, a valve normally seated in said orifice having an operating stem, a reciprocatory member slidably supporting said stem and operable to move said valve from its seat, means for manually operating said member, and automatic means for retaining said valve in open position until a predetermined quantity of liquid enters the receptacle and thereupon causing said valve to be reseated.

3. A device of the class described comprising a receptacle, and valve mechanism for admitting liquid thereto comprising a casing having a discharge orifice, a valve normally seated in said orifice having an operating stem, a reciprocatory member slidably supporting said stem and operable to lift said valve from its seat, means for manually operating said member, a reciprocatory bar positioned transversely of said stem and arranged to support the stem in position to retain the valve in open position, said bar having a recess adapted to receive said stem in one position of the bar and permit the closing of said valve, and float means controlled by the liquid in said receptacle for moving said reciprocatory bar.

4. A device of the class described comprising a receptacle, and valve mechanism for admitting liquid thereto comprising a casing having a discharge orifice, a valve normally seated in said orifice having an operating stem, a reciprocatory member slidably supporting said stem and operable to lift said valve from its seat, means for manually operating said member, a reciprocatory bar operable in transverse relation to said stem and normally supporting the end thereof to retain said valve in open position, said bar having a recess adapted to receive said stem in one position of the bar and permit the closing of said valve, and float means controlled by the liquid in said receptacle for moving said reciprocatory bar, the engagement of said stem in said recess being effective to render said float means inoperative until said valve and said stem have been lifted to open position.

5. In a device of the class described, an inlet valve mechanism comprising a casing having readily detachable upper and lower sections, a discharge orifice in said lower section, a valve controlling said orifice having a depending stem, a carrier member slidably supported in said lower section having a guide bearing for the slidable support of said stem and movable to lift said valve from its seat, said member having a transverse slot in its outer end portion into which said valve stem partially extends, a sliding bar operatively supported in said casing and positioned in said slot transversely of said stem, said bar having a recess to receive said stem and lock said bar against movement when said valve is in closed position and being adapted to support said stem and valve in elevated position in other positions of said bar, a pivoted lever operable to lift said carrier member, a float, a pivoted support for the float, and an operating connection between said support and said sliding bar.

In witness whereof I have hereunto set my hand.

OLAF LARSEN.